(No Model.) 2 Sheets—Sheet 1.
T. HILL.
DUMPING CART.
No. 283,604. Patented Aug. 21, 1883.
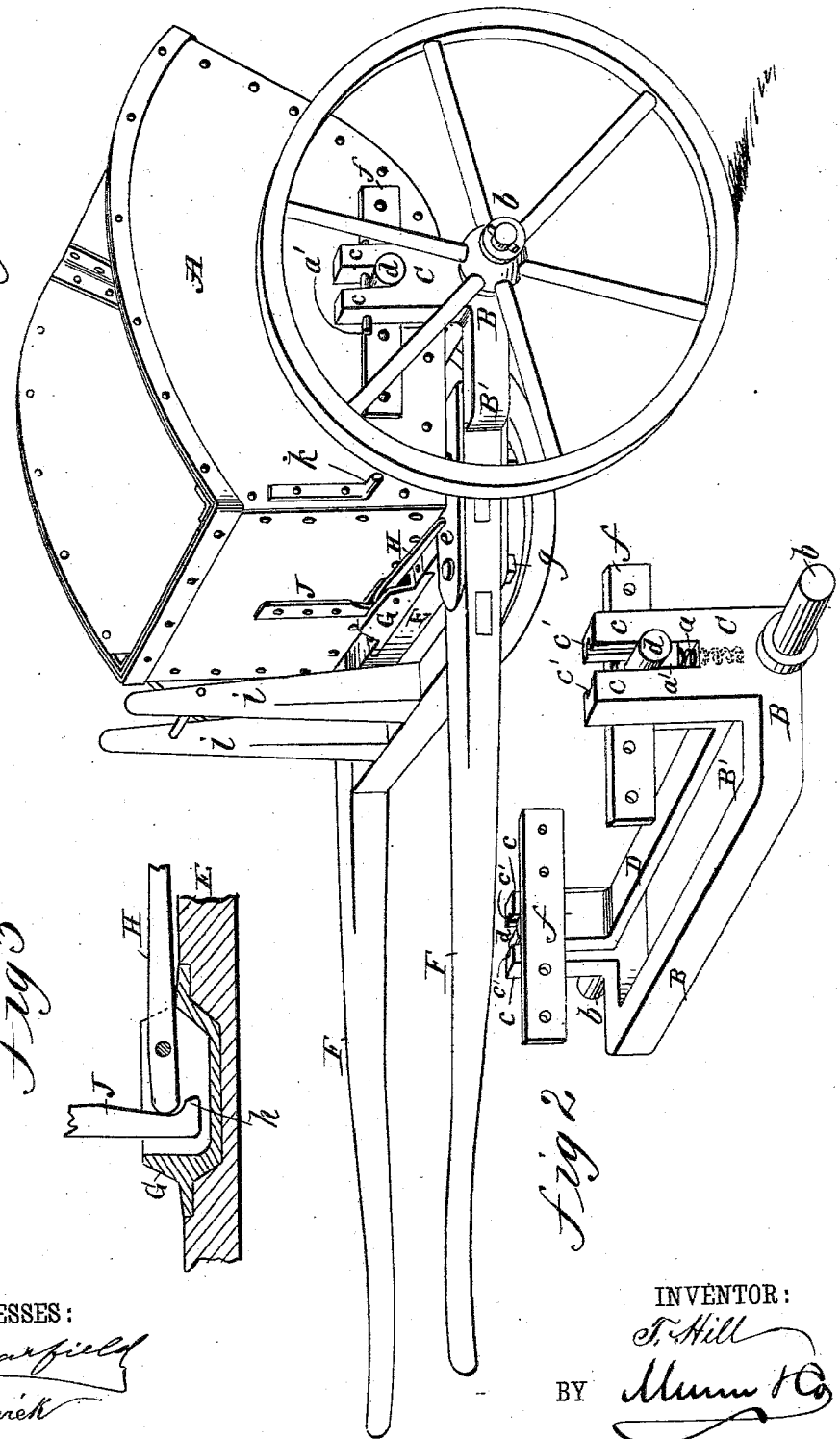
WITNESSES:
J. D. Garfield
C. Sedgwick
INVENTOR:
T. Hill
BY Munn & Co.
ATTORNEYS.

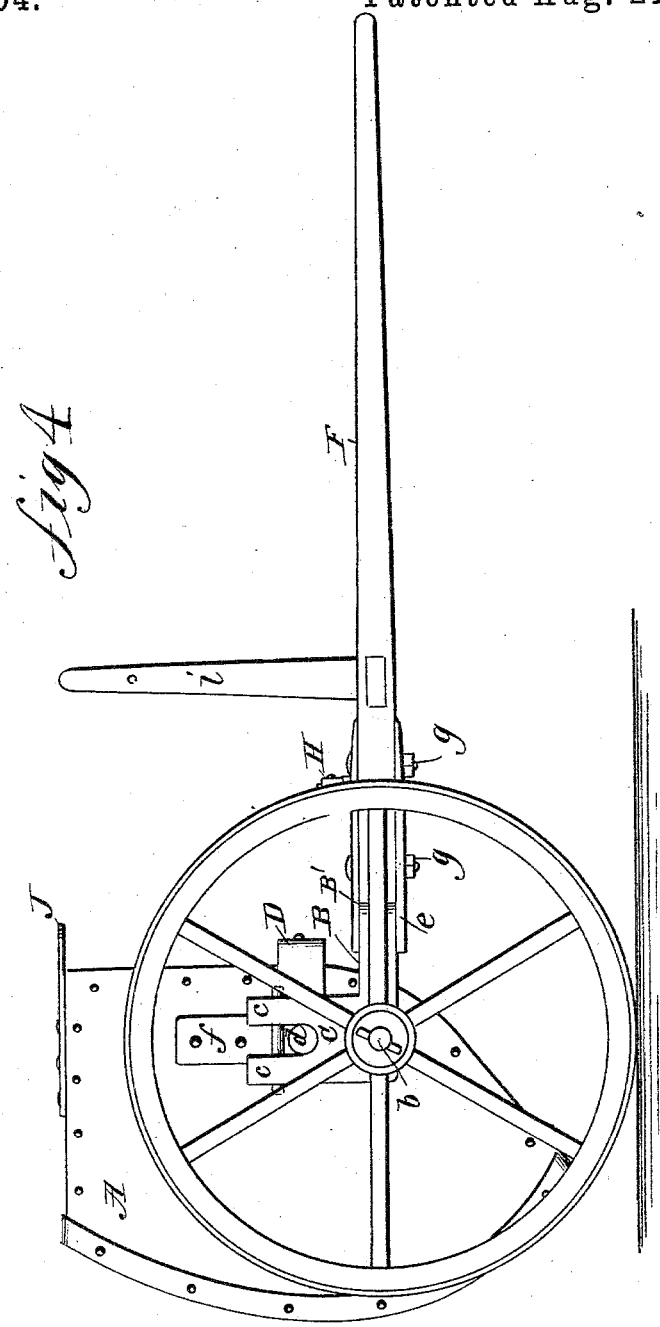

UNITED STATES PATENT OFFICE.

THOMAS HILL, OF JERSEY CITY, NEW JERSEY.

DUMPING-CART.

SPECIFICATION forming part of Letters Patent No. 283,604, dated August 21, 1883.

Application filed February 9, 1883. (No model.)

*To all whom it may concern:*

Be it known that I, THOMAS HILL, of Jersey City, in the county of Hudson and State of New Jersey, have invented a new and Improved Dumping-Cart, of which the following is a full, clear, and exact description.

The object of the invention is to improve dumping-wagons, as hereinafter described, and pointed out in the claims.

Reference is to be had to the accompanying drawings, forming part of this specification, in which similar letters of reference indicate corresponding parts in all the figures.

Figure 1 is a perspective view of my improved dumping-cart. Fig. 2 is a perspective view of the axle as I propose to construct it, together with the pivot-bars by which I mount the body or box thereon. Fig. 3 is a detail of the tripping and self-locking device by which the box is held fast while loading and transporting, and is tripped for dumping; and Fig. 4 is a side elevation of the cart, showing the box tilted up, as when dumped.

I forge the axle B, of iron or steel, in one piece, with cranked parts B', and with supporting-bearers C to receive the pivots or journals $d$ of the body-axle or pivot-bar D. Upon the axle B are journals $b$. The cranked parts B' of the axle B extend forward at right angles to journals $b$ a suitable distance to form space in which the box or body A may have room to swing when it dumps. The box or body A is mounted by the axle or bar D, having pivots $d$ to rest in the boxes $a'$, fitted in the guide-grooves $c'$ of the housings $c$ of the bearers C. The said axle or bar D is cranked downward from the pivots $d$, so that the bottom of the box, resting on said axle or bar D, will drop a suitable distance below its pivots $d$, for locating them near about its center of gravity when empty, by which the box or body A will swing back easily to the upright position after being dumped. I have in this example provided springs $a$ in the bearer C, between the housings $c$ and under the boxes $a'$, as represented in Fig. 2, for mounting the box thereon when I may wish to do so; and I may modify the arrangement of the springs by placing the spring in or on the bearer; also, by using two springs, for instance, with each bearer—one in front and one in rear—the box $a'$ having extensions through slots in the housings or around them, and I may employ any suitable form of springs. For connecting the box or body A to this axle or bar D the latter may have cross-bars $f$ forged on it, to which the body A may be riveted or bolted at the sides of the box. The box or body A may be made of iron or wood, as desired.

It will be seen that in my improvement I do away altogether with the ordinary movable tail-board to the box or body of the cart. I have in this example case made the lower rear part of the box a little rounding for the better discharge of the load; but any other suitable form of body or box may be employed, according to the nature of the goods or material that is to be carried in the vehicle.

The shafts of the cart F are attached at their rear ends to the axle B, and between the shafts, in front of the axle, is a cross-bar, E, on which is secured a socket-plate, G, which carries a fastening latch or lever, H, pivoted in the metal socket-plate G, attached to the cross-bar E. The latch H engages with the hasp J, which is rigidly attached to the front end of the box or body D, as shown, so that when the lever H is raised at its outer end it will swing clear of the hook-point $h$ of the hasp J and release the box for dumping, and when the box falls back the hook $h$, striking the lever H, will throw it up and pass by the inner end of said lever and catch under it, thereby fastening the body D automatically, as the point $h$ cannot escape until the lever is again raised.

It is to be observed that the lever H is arranged along the bar E at the front of the body D, so that the driver may raise it with the toe of his shoe, while standing on the shafts or sitting on the edge of the box, without letting go his hold of the reins. Then, after allowing the box to dump, with one hand on one of the stakes $i$ and the other on the handle $k$, he may quickly and easily swing up the box, which instantly locks itself, and go ahead.

It will be readily seen that the object of my invention is to furnish a cart which will be very simple in construction, and at the same time durable and comparatively cheap, and will save a very large percentage of the time and labor now consumed in dumping. This is accomplished by having no tail-board to remove in order to dump, or replace after dumping; hence the time and labor saved. Likewise it ameliorates the obstructions of access to and while on the dumping-dock, ferry-boat, and elsewhere, which so often occur through the present slow process of dumping. My object is accomplished in my construction of a cart in which my axle-bearers and arms are made by forging in one piece, the axle being so forged as to set back (forward) of the arms or journals, forming an inlet for the bottom part of the box to swing into, thus enabling the dumping to be effected at any desired line or pitch.

I desire it to be understood that I regard as mine any equivalent construction which shall embody and contain the spirit and substance of my invention as herein set forth. I propose to have the shafts F, which are here represented as connected to the part B' of the axle by the straps e and bolts g, so attached thereto that they may be readily detached, if so preferred, to enable the horse to be quickly transferred from one cart to another for taking away the loaded cart and leaving an empty one to be loaded.

I desire it to be understood, also, that I shall have to shape my box or body according to the line or desired pitch for dumping, as in the dumping of coal it would be a short dump, and in the dumping of dirt on a scow it would be a long dump, and would require a longer end and more tapered. The box is to be made of wood or metal, as may be preferred.

Having thus described my invention, what I claim as new, and desire to secure by Letters Patent, is—

1. The axle B, having the cranked parts B', the bearers C C, provided with housings.c, and the journals b b, in combination with the bars D, having journals d d, and cranked downwardly therefrom, whereby the body may be supported, as described.

2. The socket-plate G on the shaft, cross-bar E, and the latch H, in combination with a hasp, J, having the hook-point h, and arranged on the box A or bar D, as and for the purpose specified.

THOMAS HILL.

Witnesses:
JOHN JELLY,
JONATHAN H. BALDWIN.